Figure 1:
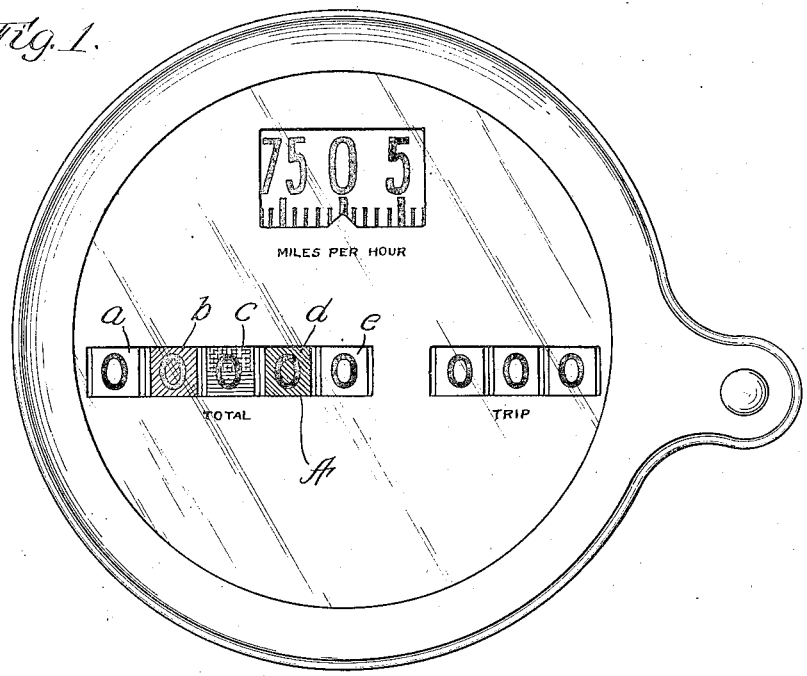

March 31, 1925.

F. G. WHITTINGTON

ODOMETER SIGNAL SYSTEM

Filed June 29, 1922

1,531,774

2 Sheets-Sheet 1

Witness:
C. E. Swanson.

Inventor:
Frederik G. Whittington
By Burton & Burton
Attys.

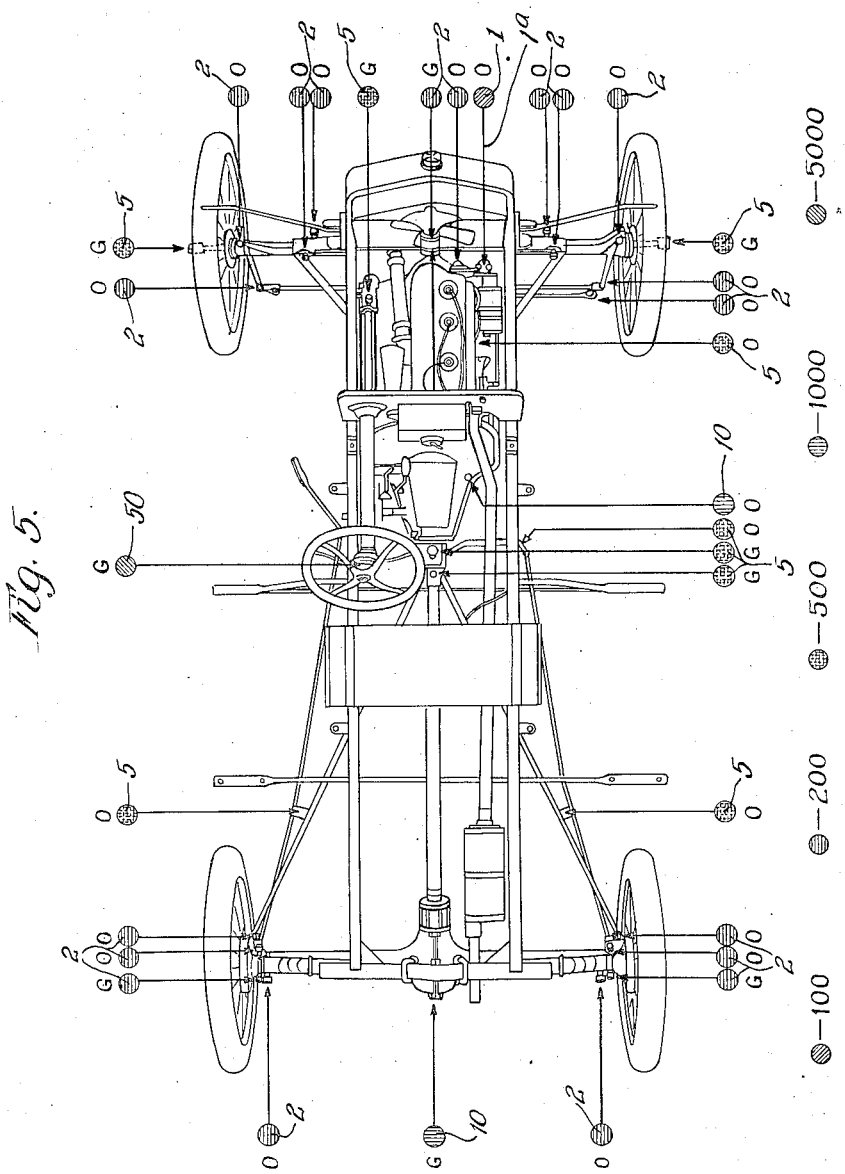

Patented Mar. 31, 1925.

1,531,774

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

ODOMETER SIGNAL SYSTEM.

Application filed June 29, 1922. Serial No. 571,790.

*To all whom it may concern:*

Be it known that I, FREDERIK G. WHITTINGTON, a citizen of the United States, residing in Evanston, in the county of Cook and State of Illinois, have invented certain new and useful Improvements in Odometer Signal Systems, of which the following is a specification, reference being had to the accompanying drawings forming a part thereof.

The purpose of this invention is to provide automatic means for notifying the driver or operator of a vehicle at intervals corresponding to the periods of travel at which various mechanical features of the vehicle will normally require attention, such as lubrication or adjustment. It consists in a combination of features and elements hereinafter described and shown in the drawings, as indicated by the claims.

In the drawings:

Figure 1 is a face view of a combined speedometer and odometer embodying this invention.

Figure 2:
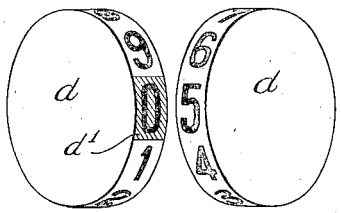

Figure 2 consists of two perspective views which together show the entire periphery of the numeral dials of the odometer train which display the "tens" digits.

Figure 3:
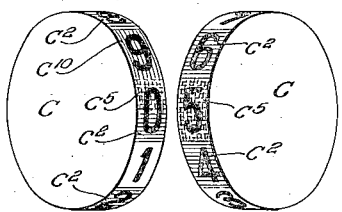

Figure 3 consists of two perspective views of the numeral dial carrying the "hundreds" digits, said views together showing the entire periphery thereof.

Figure 4:
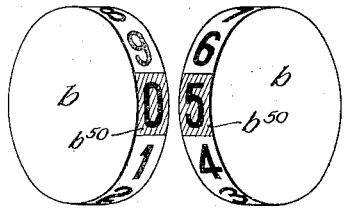

Figure 4 consists of two perspective views of the numeral dial carrying the "thousands" digits, said views together showing the entire periphery of the dial.

Figure 5 is a reproduction of a chart used in conjunction with the odometer having the special numeral dials shown in Figures 1 to 4.

It is well recognized that the life and serviceability of a vehicle, particularly a motor driven vehicle, depends upon the frequency and regularity with which lubrication of the various parts is given attention, and with which various minor adjustments are made. When these matters are neglected, the mechanism deteriorates rapidly. However, it requires considerable mechanical knowledge to properly lubricate a complicated mechanism such as that of a modern motor vehicle, and the object of this invention is to automatically furnish the driver or operator with information at proper times to enable him to apply the correct lubricant to the various parts of the mechanism at suitable intervals without attempting to remember when or how this should be done.

This information is conveyed to the operator by means of the odometer which, as usual, is geared to a moving part of the vehicle so as to indicate the aggregate mileage covered by it. As shown in Figure 1, the typical odometer includes a set of five dial wheels marked $a$, $b$, $c$, $d$ and $e$, respectively, each carrying digits from one to zero, and geared together for indicating the total mileage. Certain parts of the vehicle should be lubricated upon the completion of each hundred miles of travel. Therefore, I provide on the dial $d$, which is the second from the right hand end of the series, a green colored background $d^1$, for the area occupied by the numeral zero, (0). This numeral, being in the "tens" digit series, is displayed once and only once for each hundred miles of travel, but remains visible at the window or opening A in the dial face plate for the first ten miles of each hundred. This gives ample time for the operator to notice the colored area $d^1$. With the vehicle and odometer, I furnish a chart of the general nature of that shown in Figure 5, bearing a small signal area, 1, colored to correspond with the area $d^1$, and associated with a graphic indication, such as an arrow pointed lead line $1^a$ leading to the representation of that particular part of the vehicle mechanism which should be lubricated when the green signal $d^1$ appears at the window A. The chart in Figure 5 represents the familiar Ford chassis in which the lubrication is accomplished chiefly by a single grade of oil and with cup grease. I therefore associate with the signal 1 the letter "O," indicating that oil is to be used at this point.

Figure 3 illustrates the third dial wheel $c$, which carries three different sets of color signals. Some parts of the vehicle should be lubricated for each two hundred miles of travel; for this purpose, the dial $c$ is made with a blue background indicated at $c^2$ at each of the even numerals 2, 4, 6, 8 and 0. Certain other parts require lubrication only once in five hundred miles; for this purpose the dial $c$ carries two signal areas, $c^5$, at the numeral 5 and at the numeral 0, which are shown as colored yellow, and will appear only as each five hundred miles is covered. The area associated with the numeral 0 is colored half blue and half yellow to provide for both the required signals.

There are a few places in the chassis which need to be lubricated only once in a thousand miles of travel. It will be recognized that any one digit of the "hundreds" dial $c$ is registered only once in each thousand miles; therefore, any of the odd digits of dial $c$ may be chosen to carry this third color signal, and as shown in Figure 3, it is provided with a red background for the numeral 9 at $c^{10}$.

On the chart in Figure 5, small circular signal areas 2 are shown as being colored blue corresponding to the signal areas, $c^2$, of the dial $c$, and are each provided with direction arrows pointing to the representation of parts of the chassis to be lubricated; each signal disk has also an associated letter, "G" or "O," to indicate whether grease or oil should be used. Similarly, the chart provides color disks 5 in yellow, corresponding with the signal areas $c^5$ and disks 10 in red, to direct the driver's attention to the parts requiring lubrication when the signal area $c^{10}$ appears at the window A.

As illustrated, the instrument provides one further signal by means of two violet or purple colored areas $b^{50}$ at the numerals 5 and 0 of the "thousands" dial, $b$. This provides a signal which reappears only once in every five thousand miles, and according to the illustrative chart in Figure 5, applies only to the steering wheel reduction gears indicated by the small signal area 50.

The chart may include a color key to indicate by figures the mileage represented by each of the colored signals as shown just below the representation of the vehicle chassis in Figure 5; but such a key is not essential since the odometer itself provides the key by displaying these colors at suitable mileages automatically.

I claim:

1. In combination with an odometer comprising one or more dial wheels having the areas thereof which correspond to certain selected mileages, and which are designed to be displayed upon the completion of such mileages by the vehicle, differentiated respectively from each other and from the remaining display areas in respect to the colors displayed at said areas, a chart representing the vehicle mechanism and bearing signal areas colored like those of the odometer dials, together with graphic indications directed from such colored areas of the chart to the representations of those parts of the vehicle mechanism requiring attention at the mileage intervals corresponding to the respective colored signal areas displayed by the odometer dials.

2. The combination of a chart representing a vehicle mechanism, with colored signal areas graphically associated with certain parts thereof, and an odometer to be operatively carried by the vehicle represented and provided with dial wheels having colored signal areas, colored like those of the chart and associated with certain numerals for periodic display in the odometer at intervals to remind the operator to give attention to the parts of the mechanism indicated on the chart.

3. The combination of a chart representing a vehicle mechanism and including a plurality of differently colored signal areas graphically associated with certain parts of said mechanism, and an odometer to be operatively carried by the vehicle represented, and provided with dial wheels having differently colored signal areas corresponding in colorings to those of the chart and associated with certain numerals for periodic display in the odometer.

4. A chart for the purpose indicated, representing a vehicle mechanism and bearing colored areas together with graphic indications directed from such areas to the representations of parts of the vehicle mechanism requiring attention at different mileage intervals, and having other similarly colored index areas with adjacent numeral indications of the mileages indicated thereby.

In testimony whereof, I have hereunto set my hand at Chicago, Illinois, this 27th day of June, 1922.

FREDERIK G. WHITTINGTON.